United States Patent
Higano (10) Patent No.: US 10,012,877 B2
(45) Date of Patent: Jul. 3, 2018

(54) LIQUID CRYSTAL DISPLAY DEVICE COMPRISING A SECOND ELECTRODE HAVING A FIRST SLIT THAT INCLUDES A FIRST BENDING PORTION OVERLAID ON A FIRST ELECTRODE

(71) Applicant: Japan Display Inc., Minato-ku (JP)

(72) Inventor: Toshiyuki Higano, Tokyo (JP)

(73) Assignee: Japan Display Inc., Minato-ku (JP)

( * ) Notice: Subject to any disclaimer, the term of this patent is extended or adjusted under 35 U.S.C. 154(b) by 85 days.

(21) Appl. No.: 15/130,352

(22) Filed: Apr. 15, 2016

(65) Prior Publication Data
US 2016/0349578 A1 Dec. 1, 2016

(30) Foreign Application Priority Data

Jun. 1, 2015 (JP) .................. 2015-111405

(51) Int. Cl.
 *G02F 1/1343* (2006.01)
 *G02F 1/1337* (2006.01)
 *G02F 1/1362* (2006.01)
(52) U.S. Cl.
 CPC .. *G02F 1/134363* (2013.01); *G02F 1/133707* (2013.01); *G02F 1/136286* (2013.01); *G02F 2201/40* (2013.01)
(58) Field of Classification Search
 CPC ......... G02F 2001/133531; G02F 2001/133331
 See application file for complete search history.

(56) References Cited

U.S. PATENT DOCUMENTS

| | | | | |
|---|---|---|---|---|
| 2009/0322995 | A1* | 12/2009 | Yonemura | G02F 1/134363 349/96 |
| 2013/0050601 | A1* | 2/2013 | Takeda | G02F 1/134363 349/41 |
| 2013/0093986 | A1* | 4/2013 | Kesho | G02F 1/134309 349/139 |
| 2013/0286308 | A1* | 10/2013 | Nishida | G02F 1/139 349/33 |
| 2013/0300992 | A1* | 11/2013 | Kozuka | G02F 1/1343 349/123 |

FOREIGN PATENT DOCUMENTS

JP 2007-248892 9/2007

\* cited by examiner

*Primary Examiner* — Paul Lee
(74) *Attorney, Agent, or Firm* — Oblon, McClelland, Maier & Neustadt, L.L.P.

(57) ABSTRACT

According to one embodiment, a liquid crystal display device, includes a first substrate including a second line extending in a second direction, a first interlayer insulating film, a first electrode, a second interlayer insulating film, and a second electrode, a second substrate, a liquid crystal layer containing liquid crystal molecules initially aligned in the second direction, a first polarizer having a first transmission axis perpendicular or parallel to the second line, and a second polarizer having a second transmission axis orthogonal to the first transmission axis.

9 Claims, 7 Drawing Sheets

LIQUID CRYSTAL DISPLAY DEVICE COMPRISING A SECOND ELECTRODE HAVING A FIRST SLIT THAT INCLUDES A FIRST BENDING PORTION OVERLAID ON A FIRST ELECTRODE

CROSS-REFERENCE TO RELATED APPLICATIONS

This application is based upon and claims the benefit of priority from Japanese Patent Application No. 2015-111405, filed Jun. 1, 2015, the entire contents of which are incorporated herein by reference.

FIELD

Embodiments described herein relate generally to a liquid crystal display device.

BACKGROUND

Recently, a liquid crystal display device of a lateral electric field type has been put into practical use. For example, a configuration in which gate lines are arrayed in a horizontal direction, data lines are arrayed in a vertical direction, a common electrode layer is disposed on an entire surface and a pixel electrode layer is disposed to be overlaid on the common electrode layer, on a lower transparent panel substrate, is well known. Slits parallel to the data lines are formed in the common electrode layer. An alignment film disposed on the common electrode layer is subjected to predetermined alignment treatment. In general, a direction of alignment treatment of the alignment film or an initial alignment direction of liquid crystal molecules in the OFF state is set to intersect the direction of extension of the slits at an acute angle smaller than 45°, in the liquid crystal display device of the lateral electric field type.

In this configuration, linearly polarized light incident on a display panel has a plane of vibration parallel or orthogonal to the direction of the alignment treatment, but the plane of vibration is non-parallel and non-perpendicular to line portions such as the gate lines and the data lines. For this reason, the linearly polarized light reflected on the line portions scatters and cannot keep a certain plane of vibration. Thus, light leakage may occur near the line portions and cause the contrast ratio to be lowered.

In particular, the width of a light-shielding layer disposed at a position opposite to the line portions is reduced as the pixel size becomes smaller, in a recent high-definition liquid crystal display device. If the width of a light-shielding layer is increased to suppress the light leakage near the line portions, inconvenience such as reduction in the aperture ratio of pixels may occur.

DETAILED DESCRIPTION

In general, according to one embodiment, a liquid crystal display device, includes: a first substrate including a second line extending in a second direction, a first interlayer insulating film disposed above the second line, a first electrode disposed above the first interlayer insulating film, a second interlayer insulating film disposed above the first electrode, and a second electrode which is disposed above the second interlayer insulating film to be opposed to the first electrode and includes a first slit extending in a direction intersecting the second line; a second substrate opposed to the first substrate; a liquid crystal layer held between the first substrate and the second substrate and containing liquid crystal molecules initially aligned in the second direction; a first polarizer disposed on a side opposite to a side of the first substrate, which is opposed to the second substrate, and having a first transmission axis perpendicular or parallel to the second line; and a second polarizer disposed on a side opposite to a side of the second substrate, which is opposed to the first substrate, and having a second transmission axis orthogonal to the first transmission axis.

According to another embodiment, a liquid crystal display device, includes: a first substrate including a first line extending in a first direction, a second line extending in a second direction orthogonal to the first direction, a switching element electrically connected with the first line and the second line, a first interlayer insulating film disposed above the switching element, a first electrode disposed above the first interlayer insulating film, a second interlayer insulating film disposed above the first electrode, and a second electrode which is disposed above the second interlayer insulating film to be opposed to the first electrode and includes a slit extending in a direction different from the first direction and the second direction; a second substrate opposed to the first substrate; a liquid crystal layer held between the first substrate and the second substrate and containing liquid crystal molecules initially aligned in the second direction; a first polarizer disposed on a side opposite to a side of the first substrate, which is opposed to the second substrate, and having a first transmission axis parallel to the first direction or the second direction; and a second polarizer disposed on a side opposite to a side of the second substrate, which is opposed to the first substrate, and having a second transmission axis orthogonal to the first transmission axis.

One of the embodiments will be described hereinafter with reference to the accompanying drawings. The disclosure is a mere example, and arbitrary change of gist which can be easily conceived by a person of ordinary skill in the art naturally falls within the inventive scope. Furthermore, a width, thickness, shape, and the like of each element are depicted schematically in the Figures as compared to actual embodiments for the sake of simpler explanation, and they are not to limit the interpretation of the invention of the present application. In some cases, in each of the drawings, reference numbers of identical or similar elements, which are successively disposed, are omitted. In the specification and drawings, components that fulfill the same or similar functions are denoted by the same reference numerals and duplication of their detailed descriptions may be omitted.

In the present embodiment, a liquid crystal display device is described as an example of the display device. The liquid crystal display device can be used in, for example, various types of equipment such as smartphones, tablet terminals, mobile telephone terminals, personal computers, TV receivers, in-car equipment, and game consoles. The major configuration explained in the present embodiment can also be applied to a self-luminous display device comprising an organic electroluminescent display element, and the like, an electronic paper display device comprising a electrophoresis element, and the like, a display device employing microelectromechanical systems (MEMS), or a display device employing electrochromism.

Figure 1:
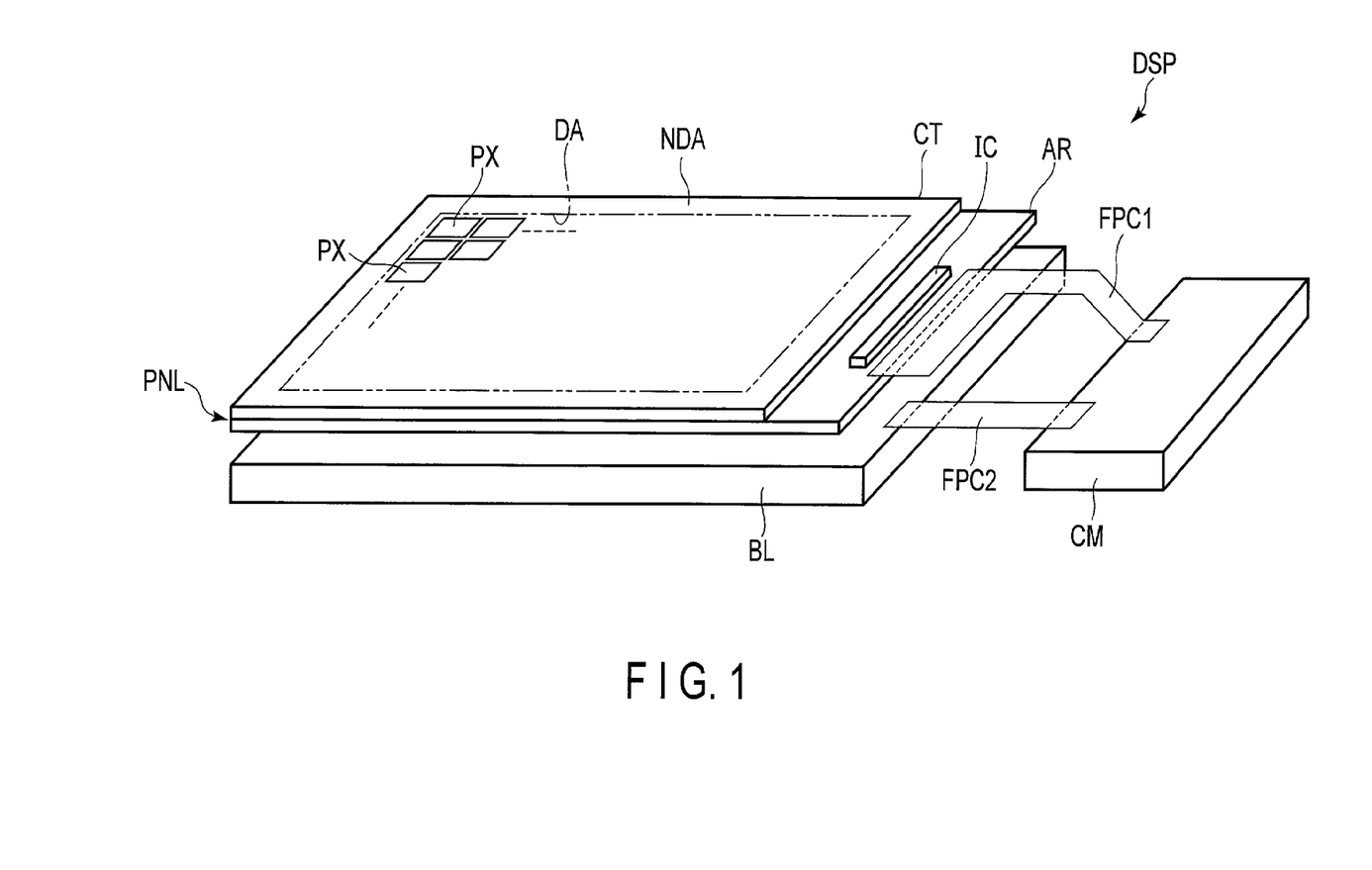
FIG. 1 is a perspective view schematically showing a configuration of a display device DSP.

FIG. 1 is a perspective view schematically showing a configuration of a display device DSP.

The display device DSP comprises an active matrix type display panel PNL, a driving IC chip IC which drives the display panel PNL, a backlight unit BL which illuminates the display panel PNL, a control module CM, flexible printed circuits FPC1 and FPC2, and the like.

The display panel PNL includes an array substrate AR and a counter-substrate CT disposed to be opposed to the array substrate AR. In the present embodiment, the array substrate AR functions as a first substrate and the counter-substrate CT functions as a second substrate. The display panel PNL includes a display area DA on which an image is displayed and a frame-shaped non-display area NDA surrounding the display area DA. The display panel PNL includes pixels PX arrayed in a matrix, in the display area DA.

The backlight unit BL is disposed on a back surface of the array substrate AR. Various types of units are applicable as the backlight unit BL, but their detailed explanations are omitted here. The driving IC chip IC is mounted on the array substrate AR. The flexible printed circuit FPC1 connects the display panel PNL with the control module CM. The flexible printed circuit FPC2 connects the backlight unit BL with the control module CM.

The display device DSP of such a configuration corresponds to a transmissive liquid crystal display device having a transmission display function of displaying an image by selectively transmitting the light incident on the display panel PNL from the backlight unit BL, at each of the pixels PX. However, the display device DSP may be a transflective liquid crystal display device having a reflection display function of displaying an image by selectively reflecting outside light or fill light, besides the transmission display function.

Figure 2:
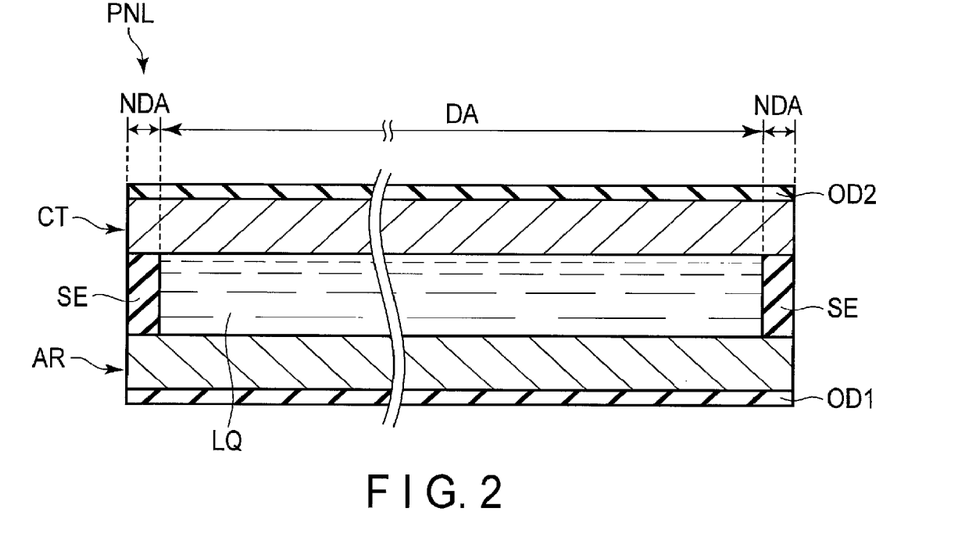
FIG. 2 is a schematic view showing a cross-section of the display panel PNL.

FIG. 2 is a schematic view showing a cross-section of the display panel PNL.

The display panel PNL includes an array substrate AR, the counter-substrate CT, a liquid crystal layer LQ, a sealing member SE, optical elements OD1 and OD2 and the like. The array substrate AR and the counter-substrate CT will be explained in detail later.

The sealing member SE is disposed in the non-display area NDA to adhere the array substrate AR and the counter-substrate CT. The liquid crystal layer LQ is held between the array substrate AR and the counter-substrate CT. The optical element OD1 is disposed on a side opposite to a surface of the array substrate AR, which is opposed to the counter-substrate CT. The optical element OD2 is disposed on a side opposite to a surface of the counter-substrate CT, which is opposed to the array substrate AR. Each of the optical elements OD1 and OD2 comprises a polarizer. Each of the optical elements OD1 and OD2 may comprise other optical elements such as a retardation film.

The details of the configuration of the display panel PNL are not explained here, but the display panel PNL may be configured to correspond to any one of a display mode using a longitudinal electric field extending along a normal line of a main substrate surface, a display mode using an oblique electric field inclined to the main substrate surface, a display mode using a lateral electric field extending along the normal line of the main substrate surface, and a display mode using arbitrary combination of the longitudinal electric field, the lateral electric field and the oblique electric field.

Figure 3:
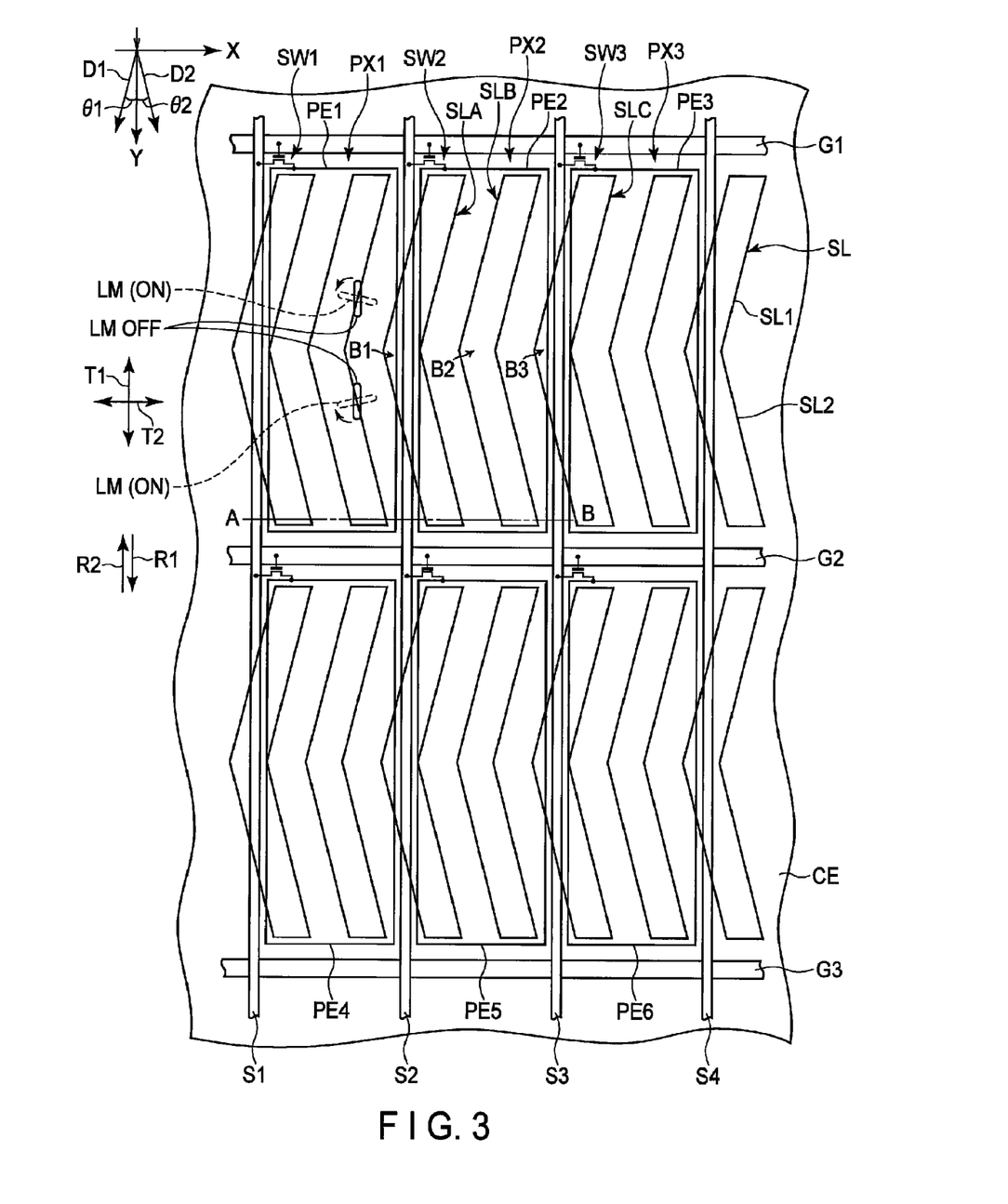
FIG. 3 is an illustration showing a configuration example of the pixels PX shown in FIG. 1.

FIG. 3 is an illustration showing a configuration example of the pixels PX shown in FIG. 1. The example of configuration explained below corresponds to the display mode using the lateral electric field, for example, fringe field switching (FFS) mode as the display mode but may correspond to the other display modes. The configuration will be explained here with reference to a plan view in an X-Y plane defined by the first direction X and the second direction Y.

Source lines S1 to S4 are arranged in the first direction X. Gate lines G1 to G3 are arranged in the second direction Y. In the example illustrated, each of the gate lines G1 to G3 corresponds to a first line and extends linearly along the first direction X. Each of the source lines S1 to S4 corresponds to a second line and extends linearly along the second direction Y. The first direction X and the second direction Y are perpendicular to each other. In other words, the gate lines G1 to G3 are perpendicular to the source lines S1 to S4. A pitch between the source lines adjacent in the first direction X is smaller than a pitch between the gate lines adjacent in the second direction Y. Pixels explained below are sectioned by the source lines and the gate lines, and shaped in a longitudinally elongated rectangle in which a length in the second direction Y is greater than a length in the first direction X.

The pixels PX1 to PX3 are arranged in the first direction X. The pixel PX1 comprises a switching element SW1 electrically connected to the gate line G1 and the source line S1 and a pixel electrode PE1 electrically connected to the switching element SW1. The pixel PX2 comprises a switching element SW2 electrically connected to the gate line G1 and the source line S2 and a pixel electrode PE2 electrically connected to the switching element SW2. The pixel PX3 comprises a switching element SW3 electrically connected to the gate line G1 and the source line S3 and a pixel electrode PE3 electrically connected to the switching element SW3.

Each of the pixel electrodes PE1 to PE3 corresponds to, for example, a first electrode and is formed in an island shape. In the example illustrated, each of the pixel electrodes PE1 to PE3 is formed in a rectangle extending in the second direction Y. The pixel electrode PE1 is surrounded by the gate lines G1 and G2, and the source lines S1 and S2. The pixel electrode PE2 is surrounded by the gate lines G1 and G2, and the source lines S2 and S3. The pixel electrode PE3 is surrounded by the gate lines G1 and G2, and the source lines S3 and S4.

The pixels arranged in the first direction X are formed between the gate lines G2 and G3, but are not explained here since they are configured similarly to the pixels PX1 to PX3.

The common electrode CE corresponds to, for example, a second electrode and extends in an upper layer of the gate lines G1 to G3, the source lines S1 to S4, the switching elements SW1 to SW3, the pixel electrodes PE1 to PE3 and the like. The details of the common electrode will be explained later with reference to a cross-sectional view. The common electrode CE is opposed to the pixel electrodes PE1 to PE3. The common electrode CE includes slits SL extending in a direction different from the first direction X and the second direction Y.

In the example illustrated, each slit SL is bent at a position opposed to the pixel electrode and formed in a V shape. The slit SL includes a first portion SL1 extending along a first extending direction D1 which intersects the second direction Y clockwise at an acute angle and a second portion SL2 extending along a second extending direction D2 which intersects the second direction Y counterclockwise at an acute angle. The first portion SL1 and the second portion SL2 are linked to each other by their own ends to form a bending portion. An angle θ1 made between the first extending direction D1 and the second direction Y is substantially the same as an angle θ2 made between the second extending direction D2 and the second direction Y. For example, each of the angles θ1 and θ2 is an acute angle of smaller than 45°, desirably, in a range from 1° to 20° and, more desirably, in a range from 7° to 15°.

The bending portions of the respective slits SL are arranged in the first direction X and arrayed at equal pitches along the first direction X. The slits SL are formed in the same shape. At least one of the slits SL is opposed to the pixel electrode. When three slits SLA, SLB and SLC arranged in the first direction X are noticed, in the example illustrated, a substantially entire body of the slit SLB is opposed to the pixel electrode PE2. The slit SLA is formed to straddle the source line S2 from a position opposed to the pixel electrode PE2 and is partially opposed to the pixel electrode PE1. The slit SLC is formed to straddle the source line S3 from a position opposed to the pixel electrode PE3 and is partially opposed to the pixel electrode PE2. In other words, in the example illustrated, the pixel electrode PE2 is opposed to the substantially entire body of the slit SLB, parts (vicinities of ends of the respective first and second portions) of the slit SLA, and a part (vicinity of the bending portion) of the slit SLC. A bending portion B1 of the slit SLA is overlaid on the source line S2, a bending portion B2 of the slit SLB is opposed to the pixel electrode PE2, and a bending portion B3 of the slit SLC is overlaid on the source line S3. The bending portions B1 to B3 are located on the same straight line along the first direction X.

Figure 4:
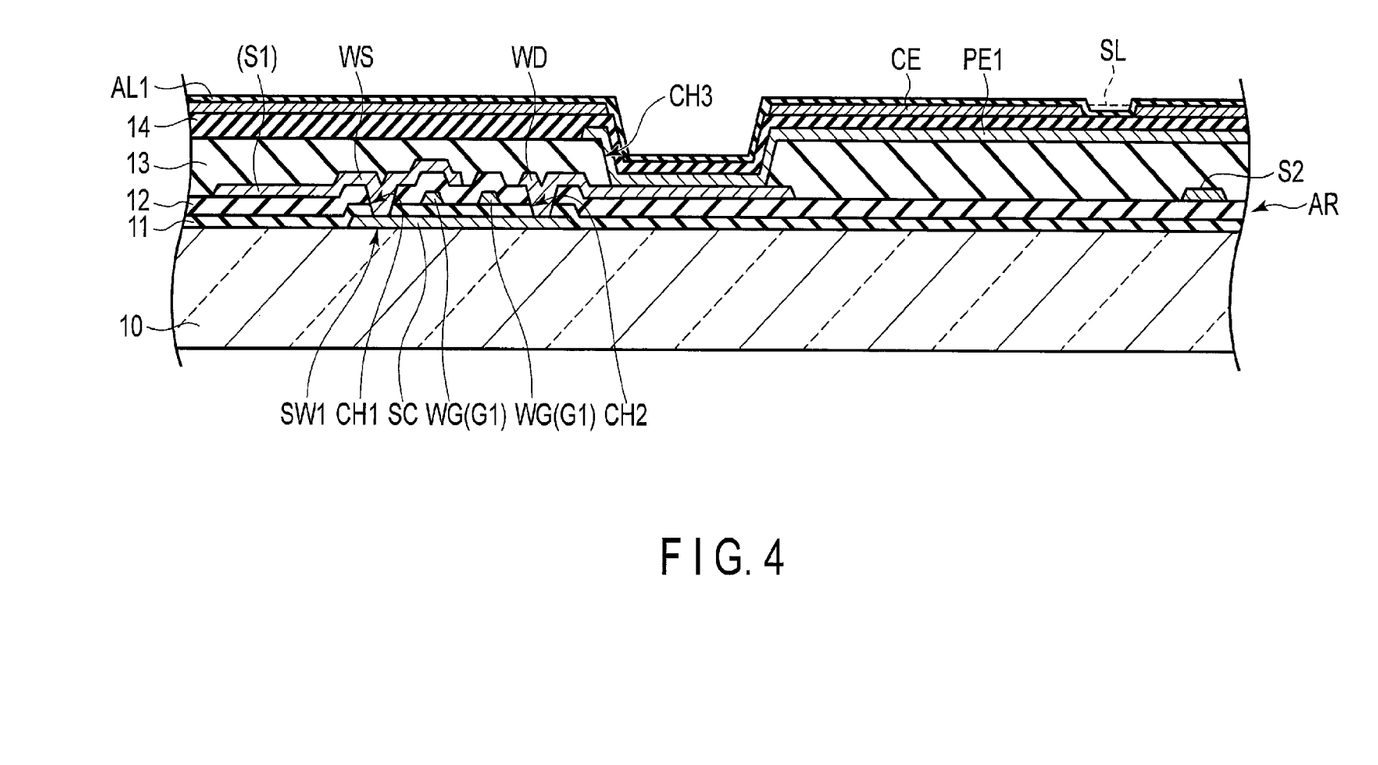
FIG. 4 is a cross-sectional view showing a structural example of the array substrate AR including the switching element SW1 and the pixel electrode PE1 shown in FIG. 3.

FIG. 4 is a cross-sectional view showing a structural example of the array substrate AR including the switching element SW1 and the pixel electrode PE1 shown in FIG. 3.

The array substrate AR is formed by using an insulating substrate 10 having a light transmitting property such as a glass substrate or a resin substrate. The array substrate AR includes the switching element SW1, the pixel electrode PE1, the common electrode CE, insulating films 11 to 14, an alignment film AL1, and like. In the example illustrated, the switching element SW1 is formed in a top-gate type double-gate structure, but may be formed in a bottom-gate type double-gate structure or a single-gate structure.

A semiconductor layer SC of the switching element SW1 is located on the insulating substrate 10 and is covered with the insulating film 11. The insulating film 11 is also disposed on the insulating substrate 10. The other insulating film may be interposed between the insulating substrate 10 and the semiconductor layer SC. A gate electrode WG of the switching element SW1 is formed integrally with the gate line G1 on the insulating film 11 and located above the semiconductor layer SC. The gate electrode WG and the gate line G1 are covered with the insulating film 12. The insulating film 12 is also disposed on the insulating substrate 11.

A source electrode WS and a drain electrode WD of the switching element SW1 are formed on the insulating film 12. Similarly, the source lines S1 and S2 are formed on the insulating film 12. The source electrode WS is formed integrally with the source line S1. The source electrode WS is in contact with the semiconductor layer SC through a contact hole CH1 which penetrates the insulating films 11 and 12. The drain electrode WD is in contact with the semiconductor layer SC through a contact hole CH2 which penetrates the insulating films 11 and 12. The switching element SW1 thus configured is covered with the insulating film 13 as well as the source lines S1 and S2. The insulating film 13 is also disposed on the insulating substrate 12. The insulating film 13 corresponds to a first interlayer insulating film disposed on the gate line G1, the source lines S1 and S2, and the switching element SW1.

The pixel electrode PE1 corresponds to the first electrode disposed on the first interlayer insulating film and is formed on the insulating film 13. The pixel electrode PE1 is in contact with the drain electrode WD of the switching element SW1 through a contact hole CH3 which penetrates the insulating film 13. The pixel electrode PE1 is covered with the insulating film 14. The insulating film 14 is also disposed on the insulating substrate 13. The insulating film 14 corresponds to a second interlayer insulating film disposed on the first electrode.

The common electrode CE corresponds to a second electrode disposed on the second interlayer insulating film and is formed on the insulating film 14 to face the pixel electrode PE1. The slits SL are formed in the common electrode CE. Each of the slits is located above the pixel electrode PE1. The common electrode CE also extends above the gate line G1 and the source lines S1 and S2 from a position opposed to the pixel electrode PE1. The pixel electrode PE1 and the common electrode CE are formed of, for example, a transparent conductive material such as Indium-Tin-Oxide (ITO) or Indium-Zinc-Oxide (IZO). The common electrode CE is covered with the alignment film AL1. The alignment film AL1 also covers the insulating film 14. The alignment film AL1 is formed of, for example, a material having a horizontal alignment property and is disposed on a surface of the array substrate AR which is in contact with the liquid crystal layer LQ.

The insulating films 11 and 12 are formed of, for example, an inorganic material such as silicon oxide or silicon nitride. The insulating film 14 is formed of, for example, an inorganic material such as silicon nitride. The insulating film 13 is formed of, for example, a transparent organic material such as a resin material. Each of the insulating films 11, 12 and 14 of the inorganic material is comparatively thin while the insulating film 13 of the organic material is thicker than the insulating films 11, 12 and 14 of the inorganic material.

Figure 5:
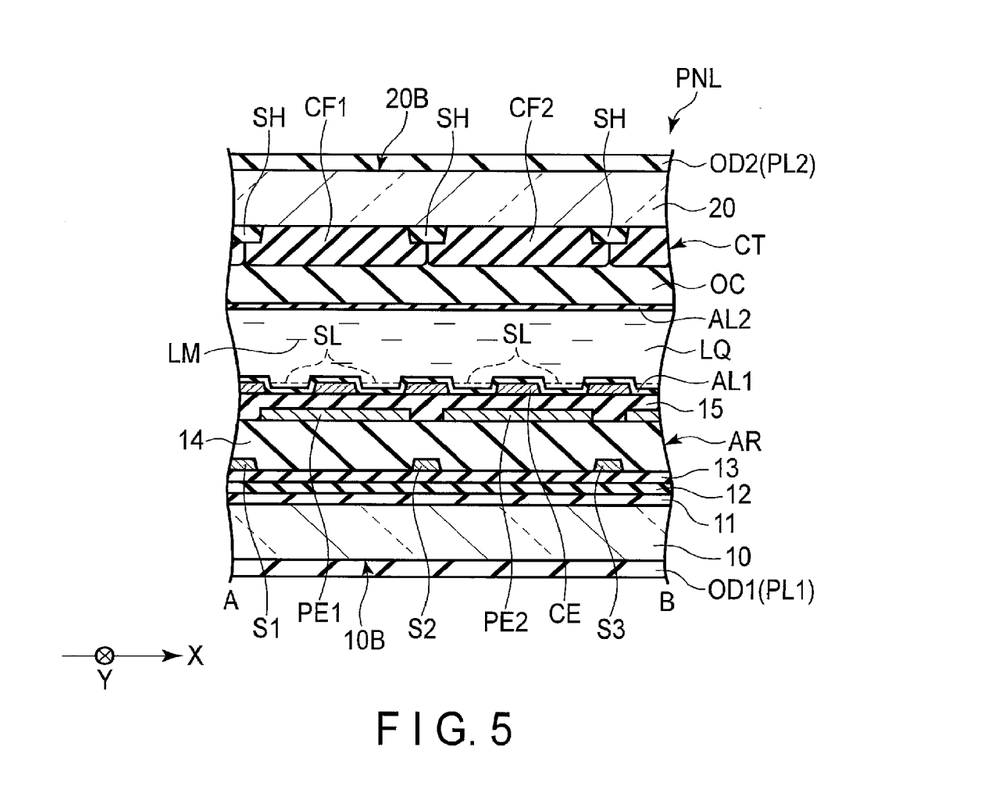
FIG. 5 is a cross-sectional view showing a structural example of the display panel PNL seen along line A-B of FIG. 3.

FIG. 5 is a cross-sectional view showing a structural example of the display panel PNL seen along line A-B of FIG. 3. On the array substrate AR, the source lines S1 to S3 are disposed between the insulating films 13 and 14. The pixel electrodes PE1 and PE2 are disposed between insulating films 14 and 15. The pixel electrode PE1 is located between the source lines S1 and S2, and the pixel electrode PE2 is located between the source lines S2 and S3. The common electrode CE is disposed between the insulating film 15 and the alignment film AL1. The common electrode CE is opposed to the pixel electrodes PE1 and PE2 and the source lines S1 to S3.

The counter-substrate CT is formed by using an insulating substrate 20 having a light transmitting property such as a glass substrate or a resin substrate. The counter-substrate CT includes a light-shielding layer SH, color filters CF1 and CF2, an overcoat layer OC, an alignment film AL2 and the like, on the side of the insulating substrate 20 which is opposed to the array substrate AR. The light-shielding layer SH is formed at a position opposed to the source lines S1 to S3. The light-shielding layer SH is also formed at a position opposed to the gate lines and the switching elements, though not shown in the drawing. The color filter CF1 is formed at a position opposed to the pixel electrode PE1. The color filter CF2 is formed at a position opposed to the pixel electrode PE2. End portions of the respective color filters CF1 and CF2 are overlaid on the light-shielding layer SH. The color filters CF1 and CF2 arranged in the first direction X are formed of resin materials of different colors. For example, each of the color filters CF1 and CF2 is a color filter of any one of red, green, blue and white. The overcoat layer OC covers the color filters CF1 and CF2. The overcoat layer OC is formed of a transparent resin material. The alignment film AL2 covers the overcoat layer OC. The alignment film AL2 is formed of a material having a horizontal alignment property. In the example illustrated, the color filters are formed on the counter-substrate CT, but may be formed on the array substrate AR.

As illustrated, both the pixel electrode PE and the common electrode CE are disposed on the array substrate AR, in the display panel PNL of the display mode using the lateral electric field. The display panel PNL may be configured to correspond to the display mode using the longitudinal electric field or the oblique electric field and, in these display modes, the pixel electrode PE is disposed on the array substrate AR while the common electrode CE is disposed on the counter-electrode CT.

The alignment films AL1 and AL2 are opposed to each other, in the array substrate AR and the counter-substrate CT. At this time, a predetermined cell gap is formed between the array substrate AR and the counter-substrate CT by a spacer (not shown). The array substrate AR and the counter-substrate CT are bonded to each other by a sealing member in a state in which the cell gap is formed. The liquid crystal layer LQ is formed of a liquid crystal composition containing liquid crystal molecules LM sealed between the alignment film AL1 of the array substrate AR and the alignment film AL2 of the counter-substrate CT.

An optical element OD1 including a first polarizer PL1 is disposed on an outer surface of the array substrate AR, i.e., an outer surface 10B of the insulating substrate 10. An optical element OD2 including a second polarizer PL2 is disposed on an outer surface of the counter-substrate CT, i.e., an outer surface 20B of the insulating substrate 20. A first transmission axis T1 of the first polarizer PL1 and a second transmission axis T2 of the second polarizer PL2 are located in, for example, a cross-Nicol relationship in which the axes intersect, in X-Y plane. In the example shown in FIG. 3, the first transmission axis T1 is parallel to the second direction Y, and the second transmission axis T2 is parallel to the first direction X. However, the first transmission axis T1 may be parallel to the first direction X, and the second transmission axis T2 may be parallel to the second direction Y. In other words, the first transmission axis T1 is parallel or perpendicular to the direction of extension of the source lines.

The alignment films AL1 and AL2 are subjected to the alignment treatment in directions parallel to each other, in a plane parallel to the main substrate surfaces (or X-Y plane) as shown in FIG. 3. Examples of the alignment treatment include rubbing treatment, optical alignment treatment and the like. If a positive liquid crystal layer LQ having a positive dielectric anisotropy is applied, for example, each of an alignment direction R1 of the alignment film AL1 and an alignment direction R2 of the alignment film AL2 is parallel to the second direction Y. However, the alignment directions R1 and R2 may be opposite to each other as illustrated or the same as each other. If a negative liquid crystal layer LQ having a negative dielectric anisotropy is applied, for example, each of the alignment directions R1 and R2 is parallel to the first direction X.

Next, the operations of the display device DSP having the above-described configuration will be explained briefly.

In a state in which no voltage is applied to the liquid crystal layer LQ, i.e., a state (OFF state) in which no electric field is formed between the pixel electrodes PE and common electrode CE, liquid crystal molecules LM contained in the liquid crystal layer LQ are initially aligned along the second direction Y in the X-Y plane, as indicated by broken lines in FIG. 3, by the alignment restriction force of the alignment films AL1 and AL2 where a direction of initial alignment of the liquid crystal molecules LM is referred to as an initial alignment direction.

Part of backlight from the backlight unit BL is transmitted through the first polarizer PL1 and made incident on the display panel PNL. The light incident on the display panel PNL is linearly polarized light parallel to the first transmission axis T1 of the first polarizer PL1. The polarized state of the linearly polarized light is hardly varied when the light is transmitted through the display panel PNL in the OFF state. For this reason, most of the linearly polarized light transmitted through the display panel PNL is absorbed by the second polarizer PL2 which is located in crossed-Nicol relationship with the first polarizer PL1 (black display). At this time, the linearly polarized light reaching the gate lines, of the linearly polarized light incident on the display panel PNL, is reflected by the gate lines in a state of maintaining the plane of vibration since the plane of vibration of the linearly polarized light is perpendicular to the direction of extension of the gate lines. In addition, the linearly polarized light reaching the source lines is reflected by the source lines in a state of maintaining the plane of vibration since the plane of vibration of the linearly polarized light is parallel to the direction of extension of the source lines. In other words, in the OFF state, the linearly polarized light reflected by the gate lines and the source lines is absorbed into the second polarizer PL2 since the plane of vibration of the linearly polarized light can be maintained constant. Light leakage in the vicinity of the gate lines and the source lines can be therefore suppressed.

In contrast, in a state in which the voltage is applied to the liquid crystal layer LQ, i.e., in a state (ON state) in which the fringe field is formed between the pixel electrodes PE and the common electrode CE, the liquid crystal molecules LM are aligned in a direction different from the initial alignment direction in the X-Y plane, by the effects of the electric field, as illustrated by broken lines in FIG. 3. The liquid crystal molecules LM of the positive liquid crystal material are aligned such that the longer axis of the liquid crystal molecules LM extends in a direction substantially parallel to the electric field in the X-Y plane. In the example illustrated in FIG. 3, the liquid crystal molecules LM rotate counterclockwise with respect to the initial alignment direction, in an area located along edges of the first portion SL1 of the slit SL while the liquid crystal molecules LM rotate clockwise with respect to the initial direction, in an area located along edges of the second portion SL2 of the slit SL. In other words, the alignment direction of the liquid crystal molecules LM is divided into two directions, at the position overlaid on the bending portion of the slit SL, and domains are formed in the respective alignment directions, in one pixel, in the ON state. The domains propagate along the edges of the slit SL.

The linearly polarized light parallel to the first transmission axis T1, of the backlight, is made incident on the display panel PNL, and the polarized state of the linearly polarized light is varied in accordance with the aligned state of the liquid crystal molecules LM when the linearly polarized light is transmitted through the liquid crystal layer LQ. For this reason, at least part of the linearly polarized light transmitted through the liquid crystal layer LQ is transmitted through the second polarizer PL2, in the ON state (white display). At this time, areas corresponding to the domains become transmissive regions through which the backlight is transmitted. In the present embodiment, since each slit SL extends outwardly from a position opposed to the pixel electrode PE, the domains are not only located at the position opposed to the pixel electrode PE, but also extended to the outer side of the pixel electrode PE, and the opening portion which substantially contributes to the display can be extended.

According to the present embodiment, one pixel can be used as multi-domains by using the linearly polarized light parallel or perpendicular to the direction of extension of the gate lines and the direction of extension of the source lines. For this reason, the viewing angle can be made wider.

Even if the linearly polarized light incident on the display panel is reflected on the gate lines and the source lines, in this configuration, undesired light leakage in the vicinity of the lines can be suppressed since the plane of vibration of the linearly polarized light is maintained. For this reason, reduction in the contrast ratio can be suppressed in the OFF state or the black display state. In contrast, the width of the light-shielding layer SH thus opposed to the lines does not need to be increased for a measure against the light leakage in the vicinity of the line, and reduction in the area of the opening portion or reduction in the transmittance in the ON state can be suppressed.

Furthermore, the opening portion can be expanded since the domains propagating along the edges of the slits are not only located in the area opposed to the pixel electrode PE, but also extended to the outer side of the pixel electrode PE.

Even if a great potential difference between adjacent pixel electrodes occurs, leakage of the undesired electric field to the liquid crystal layer, which results from the potential difference between the pixel electrodes, can be suppressed since the common electrode extending not only in each pixel, but also across the pixels is located more closely to the liquid crystal layer side than to the pixel electrode. In addition, leakage of the undesired electric field from the gate lines and the source lines to the liquid crystal layer can be suppressed since the common electrode is located more closely to the liquid crystal layer side than to the gate lines and the source lines. The display failure which occurs together with alignment failure of the liquid crystal molecules can be therefore suppressed.

Display quality can be therefore improved.

Next, another configuration example of the present embodiment will be explained.

Figure 6:
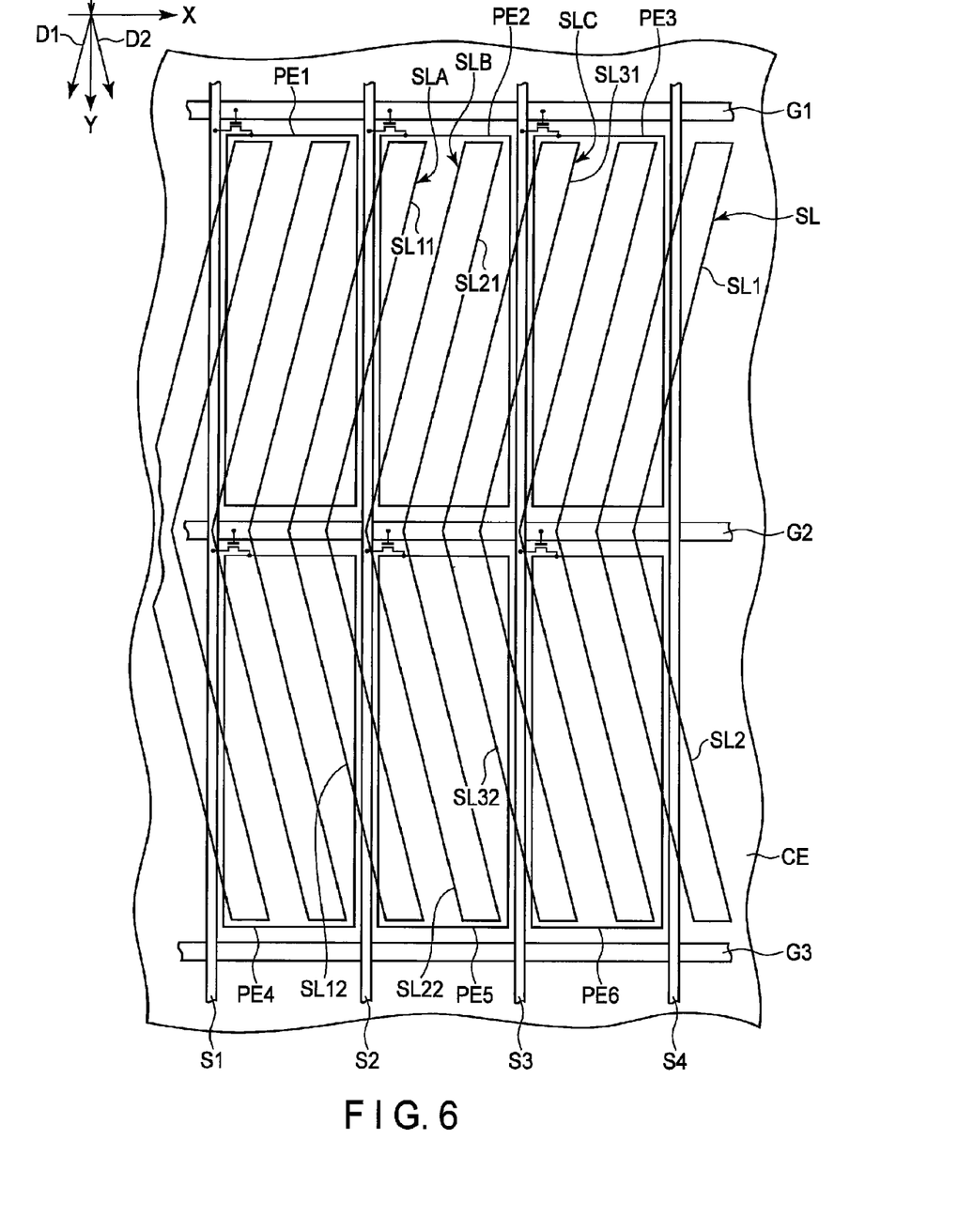
FIG. 6 is an illustration showing another configuration example of the pixels PX shown in FIG. 1.

FIG. 6 is an illustration showing another configuration example of the pixels PX shown in FIG. 1. The illustrated configuration example is different from the configuration example shown in FIG. 3 with respect to a feature that each slit SL is located at a position opposed to the pixel electrode PE to extend linearly. The other constituent elements are not explained in detail here since they are the same as those of the configuration example shown in FIG. 3.

The pixel electrodes PE1 to PE3 are located between the gate lines G1 and G2 and arranged in the first direction X. The pixel electrodes PE4 to PE6 are located between the gate lines G2 and G3 and arranged in the first direction X. For example, the pixel electrodes arranged in the second direction Y are opposed to color filters of the same color, for example, the pixel electrodes PE1 and PE4 are opposed to red color filters, the pixel electrodes PE2 and PE5 are opposed to green color filters, and the pixel electrodes PE3 and PE6 are opposed to blue color filters.

The common electrode CE extends on an upper layer of the gate lines G1 to G3 and the source lines S1 to S4. The common electrode CE is opposed to the pixel electrodes PE1 to PE6. The common electrode CE includes slits SL extending in a direction different from the first direction X and the second direction Y.

In the example illustrated, each of the slits SL is formed in a V shape and opposed to two pixel electrodes adjacent in the second direction Y. In each slit SL, the first portion SL1 extends linearly along the first extending direction D1, at a position between the gate lines G1 and G2, and the second portion SL2 extends linearly along the second extending direction D2, at a position between the gate lines G2 and G3. The first portions SL1 are opposed to the pixel electrodes PE1 to PE3, respectively. The second portions SL2 are opposed to the pixel electrodes PE4 to PE6, respectively. The first portions SL1 and the second portions SL2 are linked to each other by their own ends, at positions opposed to the gate line G2, to form bending portions.

The bending portions of the respective slits SL are arranged in the first direction X, at the positions opposed to the gate line G2, and arrayed at equal pitches along the first direction X. The slits SL are formed in the same shape. When three slits SLA, SLB and SLC arranged in the first direction X are noticed, in the example illustrated, a substantially entire body of a first portion SL21 of the slit SLB is opposed to the pixel electrode PE2, and a substantially entire body of a second portion SL22 of the slit SLB is opposed to the pixel electrode PE5. A first portion SL11 of the slit SLA is formed to straddle the source line S2 from a position opposed to the pixel electrode PE2 and is partially opposed to the pixel electrode PE1. A second portion SL12 of the slit SLA is formed to straddle the source line S2 from a position opposed to the pixel electrode PE5 and is partially opposed to the pixel electrode PE4. A first portion SL31 of the slit SLC is formed to straddle the source line S3 from a position opposed to the pixel electrode PE3 and is partially opposed to the pixel electrode PE2. A second portion SL32 of the slit SLC is formed to straddle the source line S3 from a position opposed to the pixel electrode PE6 and is partially opposed to the pixel electrode PE5.

In this configuration example, two pixels arranged in the second direction Y can be used as multi-domains. In addition, occurrence of a dark line resulting from an area in which different domains are antagonistic, in one pixel, can be suppressed.

In this configuration example, too, the same advantages as those of the above-described configuration example can be obtained.

Figure 7:
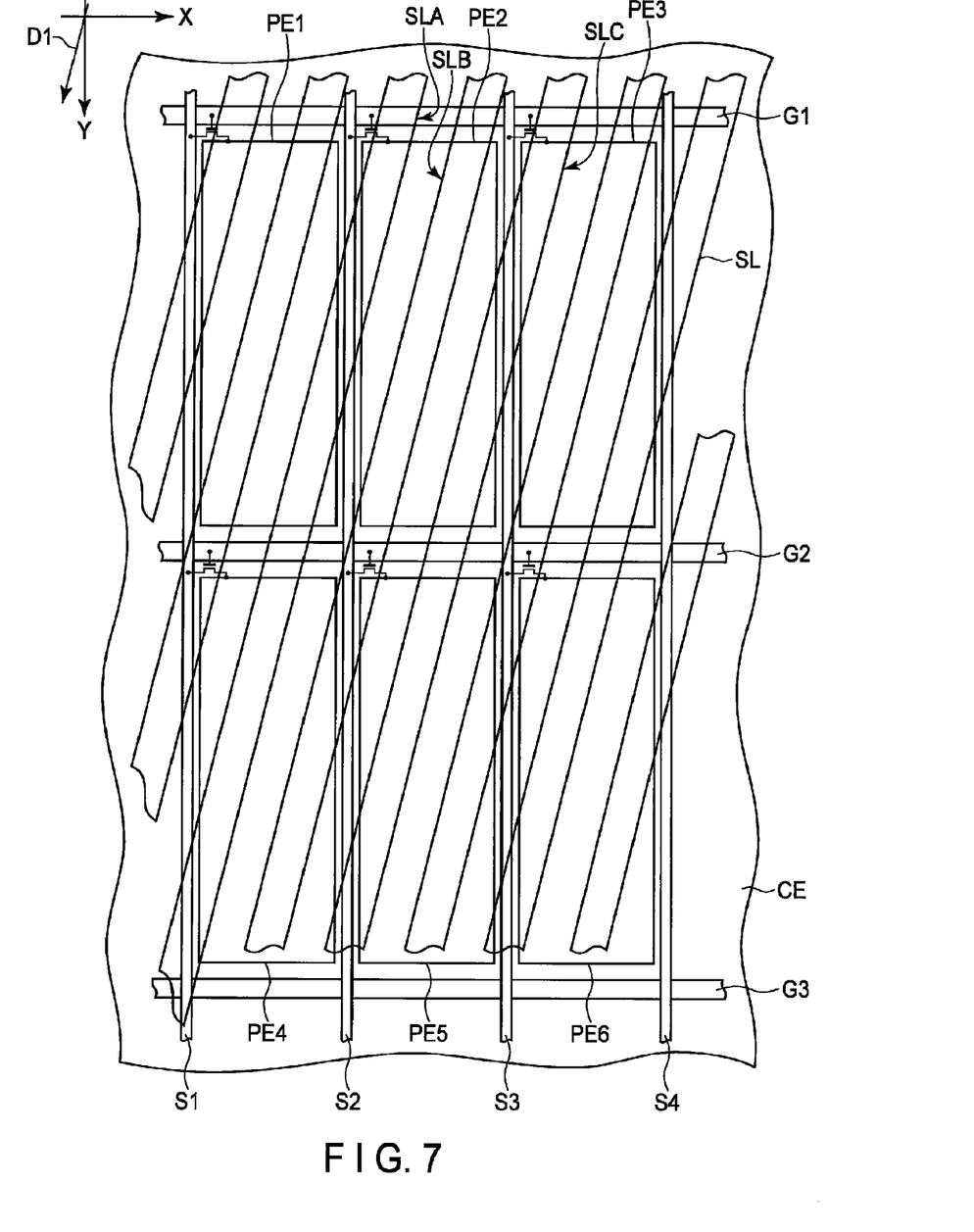
FIG. 7 is an illustration showing yet another configuration example of the pixels PX shown in FIG. 1.

FIG. 7 is an illustration showing yet another configuration example of the pixels PX shown in FIG. 1. The illustrated configuration example is different from the configuration example shown in FIG. 6 with respect to a feature that each slit SL extends sequentially and linearly. The other constituent elements are not explained in detail here since they are the same as those of the configuration example shown in FIG. 6.

The common electrode CE includes slits SL extending in the first extending direction D1 different from the first direction X and the second direction Y. The slits SL are arranged at equal pitches along the first direction X. The slits SL are formed in the same shape. When three slits SLA, SLB and SLC arranged in the first direction X are noticed, in the example illustrated, the slit SLA straddles the source line S2 at a position opposed to the pixel electrode PE2 so as to be opposed to the pixel electrode PE1, and further straddles the gate line G2 so as to be opposed to the pixel electrode PE4. The slit SLB straddles the gate line G2 from a position opposed to the pixel electrode PE2 and is opposed to the pixel electrodes PE4 and PE5. The slit SLC straddles the source line S3 from a position opposed to the pixel electrode PE3 so as to be opposed to the pixel electrode PE2, and further straddles the gate line G2 so as to be opposed to the pixel electrode PE4.

In this configuration example, occurrence of a dark line resulting from an area in which different domains are antagonistic, in one pixel, can be suppressed. In this configuration example, too, the same advantages as those of the above-described configuration example can be obtained.

Figure 8:
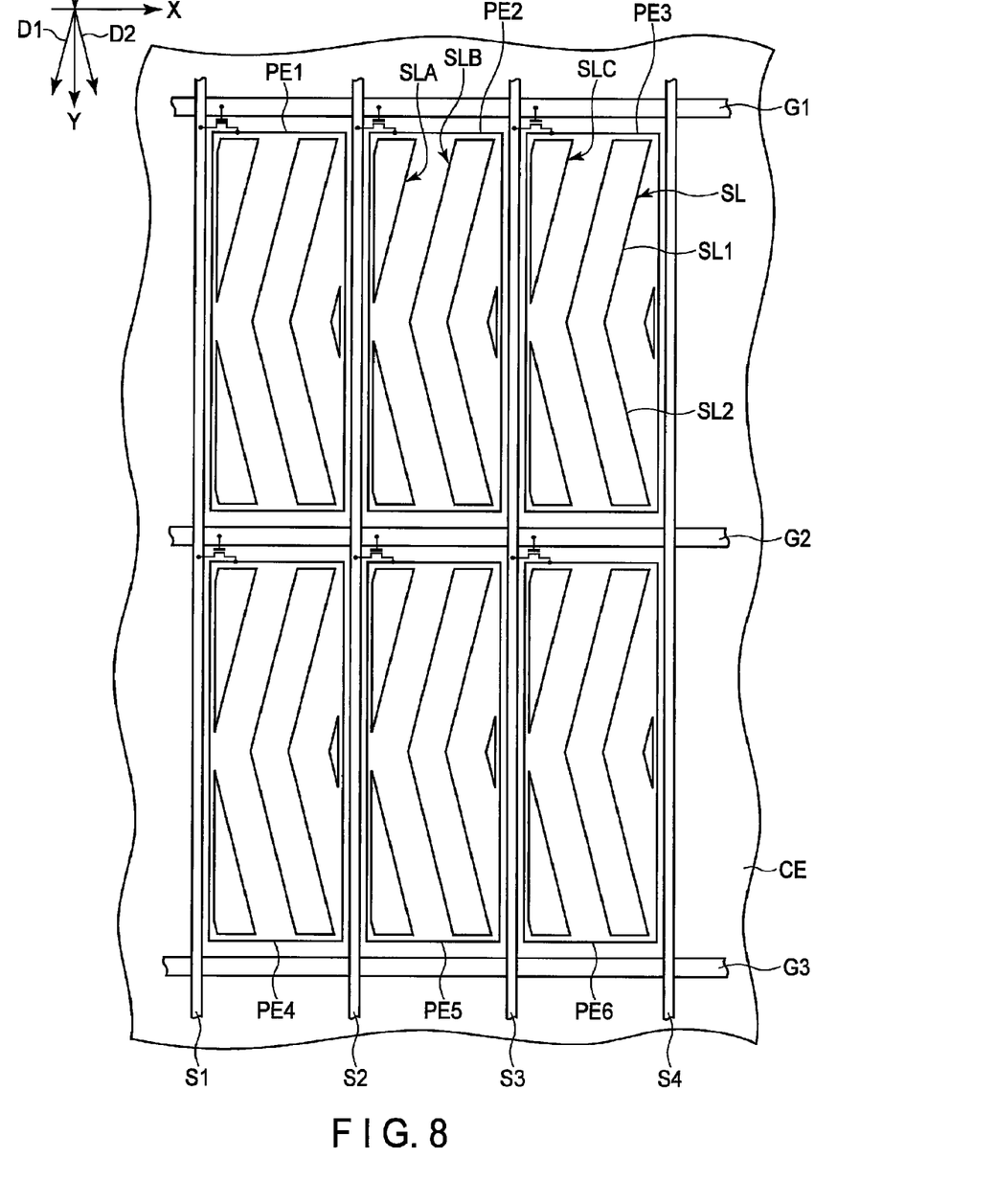
FIG. 8 is an illustration showing yet another configuration example of the pixels PX shown in FIG. 1.

FIG. 8 is an illustration showing yet another configuration example of the pixels PX shown in FIG. 1. The illustrated configuration example is different from the configuration example shown in FIG. 3 with respect to a feature that the slits SL are cut at positions opposed to the source lines. The other constituent elements are not explained in detail here since they are the same as those of the configuration example shown in FIG. 3.

The common electrode CE includes slits SL extending in a direction different from the first direction X and the second direction Y. In the example illustrated, each slit SL is formed in a V shape and includes the first portion SL1 extending along the first extending direction D1 and the second portion SL2 extending along the second extending direction D2. The slits SL are arranged at equal pitches along the first direction X. When three slits SLA, SLB and SLC arranged in the first direction X are noticed, in the example illustrated, a substantially entire body of the slit SLB is opposed to the pixel electrode PE2. The slit SLA is cut at a position opposed to the source line S2 and is partially opposed to the pixel electrodes PE1 and PE2. The slit SLC is cut at a position opposed to the source line S3 and is partially opposed to the pixel electrodes PE2 and PE3.

In this configuration example, too, the same advantages as those of the above-described configuration example can be obtained. In addition, leakage of the undesired electric field from the source lines to the liquid crystal layer can be suppressed since substantially entire source lines are covered with the common electrode CE.

In the above-described embodiment, the gate lines correspond to the first lines and the source lines correspond to the second lines, but the gate lines may correspond to the second lines and the source lines may correspond to the first lines. In addition, in the embodiment, the pixel electrode corresponds to the first electrode and the common electrode corresponds to the second electrode but, the pixel electrode may correspond to the second electrode and the common electrode may correspond to the first electrode and, in this case, the common electrode may be disposed between the insulating films 14 and 15, the pixel electrode may be disposed between the insulating film 15 and the alignment film AL1, and the slit opposed to the common electrode may be formed in the pixel electrode.

As described above, a liquid crystal display device capable of improving the display quality can be provided according to the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device, comprising:
a first substrate including a second line extending in a second direction, a first interlayer insulating film disposed above the second line, a first electrode disposed above the first interlayer insulating film, a second interlayer insulating film disposed above the first electrode, and a second electrode which is disposed above the second interlayer insulating film to be opposed to the first electrode and includes a first slit extending in a direction intersecting the second line;
a second substrate opposed to the first substrate;
a liquid crystal layer held between the first substrate and the second substrate and containing liquid crystal molecules initially aligned in the second direction;
a first polarizer disposed on a side opposite to a side of the first substrate, which is opposed to the second substrate, and having a first transmission axis perpendicular or parallel to the second line; and
a second polarizer disposed on a side opposite to a side of the second substrate, which is opposed to the first substrate, and having a second transmission axis orthogonal to the first transmission axis, wherein
the first substrate further includes a switching element electrically connected with the first electrode,
the second electrode extends above the second line from a position opposed to the first electrode, and
the first slit includes a first bending portion overlaid on the first electrode.

2. The liquid crystal display device of claim 1, wherein the first slit is formed in a V shape including a first portion extending along a first extending direction and a second portion extending along a second extending direction, and
an angle made between the first extending direction and the second direction is equal to an angle made between the second extending direction and the second direction.

3. The liquid crystal display device of claim 1, wherein the second electrode includes a second slit formed to extend parallel to the first slit and to straddle the second line from a position opposed to the first electrode.

4. The liquid crystal display device of claim 3, wherein the second slit includes a second bending portion overlaid on the second line.

5. A liquid crystal display device comprising:
a first substrate including a second line extending in a second direction, a first interlayer insulating film disposed above the second line, a first electrode disposed above the first interlayer insulating film, a second interlayer insulating film disposed above the first electrode, and a second electrode which is disposed above the second interlayer insulating film to be opposed to the first electrode and includes a first slit extending in a direction intersecting the second line;

a second substrate opposed to the first substrate;

a liquid crystal layer held between the first substrate and the second substrate and containing liquid crystal molecules initially aligned in the second direction;

a first polarizer disposed on a side opposite to a side of the first substrate, which is opposed to the second substrate, and having a first transmission axis perpendicular or parallel to the second line; and a second polarizer disposed on a side opposite to a side of the second substrate, which is opposed to the first substrate, and having a second transmission axis orthogonal to the first transmission axis, wherein the first substrate further includes a switching element electrically connected with the first electrode, the second electrode extends above the second line from a position opposed to the first electrode, the first slit extends linearly at a position overlaid on the first electrode, the first substrate further includes a first line intersecting the second line, and the first slit includes a first bending portion overlaid on the first line.

6. The liquid crystal display device of claim 5, wherein the first slit is formed in a V shape including a first portion extending along a first extending direction and a second portion extending along a second extending direction, and an angle made between the first extending direction and the second direction is equal to an angle made between the second extending direction and the second direction.

7. The liquid crystal display device of claim 6, wherein the second electrode includes a second slit formed to extend parallel to the first slit and to straddle the second line from a position opposed to the first electrode.

8. The liquid crystal display device of claim 7, wherein the first substrate further includes a third electrode disposed above the first interlayer insulating film to be adjacent to the first electrode, the second line is located between the first electrode and the third electrode, in planar view, and the first slit intersects the second line and extends linearly at a position overlaid on the first electrode and the third electrode.

9. A liquid crystal display device, comprising:

a first substrate including a first line extending in a first direction, a second line extending in a second direction orthogonal to the first direction, a switching element electrically connected with the first line and the second line, a first interlayer insulating film disposed above the switching element, a first electrode disposed above the first interlayer insulating film, a second interlayer insulating film disposed above the first electrode, and a second electrode which is disposed above the second interlayer insulating film to be opposed to the first electrode and includes a slit extending in a direction different from the first direction and the second direction;

a second substrate opposed to the first substrate;

a liquid crystal layer held between the first substrate and the second substrate and containing liquid crystal molecules initially aligned in the second direction;

a first polarizer disposed on a side opposite to a side of the first substrate, which is opposed to the second substrate, and having a first transmission axis parallel to the first direction or the second direction; and a second polarizer disposed on a side opposite to a side of the second substrate, which is opposed to the first substrate, and having a second transmission axis orthogonal to the first transmission axis, wherein the first electrode is electrically connected with the switching element, the second electrode extends above the first line and the second line from a position opposed to the first electrode, and the slit is bent at a position opposed to the first electrode.

* * * * *